(12) United States Patent
Moran et al.

(10) Patent No.: US 12,320,107 B2
(45) Date of Patent: Jun. 3, 2025

(54) SHOWER ADAPTER DEVICE (71) Applicants: Kevin Francis Moran, South Lyon, MI (US); Elliott Richard Heinrich, Grand Rapids, MI (US)

(72) Inventors: Kevin Francis Moran, South Lyon, MI (US); Elliott Richard Heinrich, Grand Rapids, MI (US)

( * ) Notice: Subject to any disclaimer, the term of this patent is extended or adjusted under 35 U.S.C. 154(b) by 600 days.

(21) Appl. No.: 17/674,499

(22) Filed: Feb. 17, 2022

(65) Prior Publication Data
US 2023/0257975 A1     Aug. 17, 2023

(51) Int. Cl.
| E03C 1/06 | (2006.01) |
| A01K 13/00 | (2006.01) |
| B67C 11/02 | (2006.01) |
| E03C 1/04 | (2006.01) |
| E03C 1/086 | (2006.01) |

(52) U.S. Cl.
CPC ............ *E03C 1/086* (2013.01); *A01K 13/001* (2013.01); *B67C 11/02* (2013.01); *E03C 1/0408* (2013.01); *E03C 1/06* (2013.01)

(58) Field of Classification Search
CPC ....... A01K 13/001; B67C 11/00; B67C 11/02; E03C 1/086; E03C 1/0408; E03C 1/06; E03C 1/08
See application file for complete search history.

(56) References Cited

U.S. PATENT DOCUMENTS

| 2,326,479 | A | * | 8/1943 | Mejdrich | ................ E03C 1/086 |
| | | | | | 285/8 |
| 2,383,235 | A | * | 8/1945 | Brown | ..................... F16L 37/48 |
| | | | | | 285/8 |
| 2,900,139 | A | * | 8/1959 | Hensley, Jr. | ............ E03C 1/086 |
| | | | | | 4/615 |
| D274,168 | S | * | 6/1984 | Whedon | ...................... D23/213 |
| 4,600,125 | A | * | 7/1986 | Maynard, Jr. | ........... B67C 11/00 |
| | | | | | 141/330 |
| 4,784,184 | A | * | 11/1988 | Gates | ...................... E03C 1/086 |
| | | | | | 285/8 |

(Continued)

FOREIGN PATENT DOCUMENTS

| DE | 202010010889 | 11/2010 |
| GB | 2468654 | 7/2013 |

OTHER PUBLICATIONS

Shower Head, Stainless Steel, Oct. 3, 2017, amazon.ca, 5e/19/2023, URL: https://www.amazon.ca/dp/B0078RZ62K/ref=sbl_dpx_ca-home-improvement-bathroom-fixed-showerheads_B09KV26DM4_0 (Year:2017).

(Continued)

*Primary Examiner* — Nicolas A Arnett
(74) *Attorney, Agent, or Firm* — Burris Law, PLLC (57) ABSTRACT

A shower attachment device includes a funnel, an elastic cord, a cleat, and a hose. The funnel includes a top portion defining an inlet and a bottom portion defining an outlet. The elastic cord is coupled to a first side of the top portion. The cleat extends from a second side of the top portion that is opposite the first side. The cleat is configured to cooperate with the elastic cord to permit the elastic cord to be removably coupled to the second side of the top portion. The hose is attached to the outlet and in fluid communication with an interior of the funnel.

14 Claims, 8 Drawing Sheets

(56) References Cited

U.S. PATENT DOCUMENTS

| | | | | |
|---|---|---|---|---|
| 5,052,149 | A * | 10/1991 | Johnson | A01G 27/00 |
| | | | | D11/164 |
| 5,967,201 | A * | 10/1999 | Gasior | B67C 11/04 |
| | | | | 141/340 |
| 6,315,220 | B1 * | 11/2001 | Grubb | F16L 37/48 |
| | | | | 4/615 |
| D454,938 | S * | 3/2002 | Lord | D23/213 |
| D468,800 | S * | 1/2003 | Tse | D23/213 |
| D475,119 | S * | 5/2003 | Colligan | D23/213 |
| D501,243 | S * | 1/2005 | Blomstrom | D23/229 |
| D511,810 | S * | 11/2005 | Hanna | D23/229 |
| D572,796 | S * | 7/2008 | Genord | D23/229 |
| D588,675 | S * | 3/2009 | Grocholske | D23/213 |
| D610,226 | S * | 2/2010 | Yabe | D23/213 |
| D687,924 | S * | 8/2013 | Newson | D23/213 |
| 8,566,973 | B2 * | 10/2013 | Duczak | A01K 13/001 |
| | | | | 4/615 |
| 9,080,320 | B1 * | 7/2015 | Taylor | B05B 1/185 |
| 9,216,425 | B2 * | 12/2015 | Ojea | E03C 1/086 |
| D759,198 | S | 6/2016 | Schultz | |
| 9,725,292 | B2 * | 8/2017 | Friedlich | B67C 11/00 |
| 9,820,909 | B2 * | 11/2017 | Enlow | A61H 33/6036 |
| 9,845,233 | B1 * | 12/2017 | Stibinger | B67C 11/02 |
| 10,144,628 | B1 * | 12/2018 | Hardy | B67C 11/00 |
| 10,358,802 | B2 * | 7/2019 | Chiu | E03C 1/06 |
| 10,393,300 | B1 * | 8/2019 | Lane | F16L 11/00 |
| 10,413,478 | B2 * | 9/2019 | Davis | A47K 3/286 |
| 11,085,567 | B2 * | 8/2021 | Lane | F16L 37/04 |
| D934,994 | S * | 11/2021 | Fantini | D23/213 |
| 11,186,969 | B2 * | 11/2021 | Mesiemore | E03B 1/048 |
| 11,274,424 | B2 * | 3/2022 | Schuster | F16L 33/223 |
| 11,365,838 | B1 * | 6/2022 | Lane | B05B 15/656 |
| 2003/0015187 | A1 * | 1/2003 | Koncelik, Jr. | A47J 37/0786 |
| | | | | 126/25 C |
| 2009/0133886 | A1 * | 5/2009 | Van Noord | F16L 37/48 |
| | | | | 137/799 |
| 2012/0267006 | A1 * | 10/2012 | Liao | B67C 11/02 |
| | | | | 141/331 |
| 2017/0209640 | A1 * | 7/2017 | Felder | A61M 3/0241 |

OTHER PUBLICATIONS

United States Patent and Trademark Office, Ex Parte Quayle Office Action, U.S. Appl. No. 29/827,164, Issued May 30, 2023.

Rohl B2160/1PN Bossini Cloudburst Showerhead, Polished Nickel, Feb. 15, 2016, amazon.ca, May 19, 2023, URL: https://www.amazon.ca/dp/B0074IOOC6/ref=sbl_dpx_ca-home-improvement-bathroom-fixed-showerheads_B0078RZ62K_0 (Year:2016).

* cited by examiner

SHOWER ADAPTER DEVICE

FIELD

The present disclosure relates to a shower adapter device.

BACKGROUND

The statements in this section merely provide background information related to the present disclosure and may not constitute prior art.

A shower head is typically affixed to a wall and is typically high up such that the shower head is configured to spray a plurality of fine water jets down onto a user that is standing in the shower. It can be difficult to perform some tasks with such fixed shower heads. For example, it can be difficult to wash pets, small children, or even to clean low parts of the shower walls or parts that are otherwise not within the flow path of the shower head.

While some shower heads exist that are removably mounted to the wall and fed water via a flexible hose directly connected to the shower head (also referred to as "handheld showers"), such handheld showers are not available to everyone. For example, it can be difficult to install a traditional handheld shower without specific knowledge of the plumbing trades. Such handheld shower heads can also be expensive. In some areas, it can also be illegal to perform the plumbing required to switch from a fixed shower head to a handheld shower head without a permit or without hiring licensed plumber. Additionally, in some situations, replacing the fixed shower head with a handheld shower can be forbidden or otherwise undesirable (e.g., in a rental unit or a hotel). Furthermore, typical handheld showers release the water at high pressure and with a loud noise that can be frightening to some animals.

Some adapter devices exist that include a coupling that has one end that seals around a fixed shower head and another end that attaches to a hose are known. However, these adapters can be difficult to attach to the showerhead, can be prone to leaks or breakage, and may not fit every size or shape of showerhead.

In some situations, such as when washing a pet, traditional handheld showerheads and existing adapters still require a user to hold the handheld showerhead or hose with one hand while applying soap to the pet with the other hand. This can be difficult when the pet also needs to be restrained.

The present disclosure addresses these and other issues associated with handheld showers and traditional shower adapter devices.

SUMMARY

This section provides a general summary of the disclosure and is not a comprehensive disclosure of its full scope or all of its features.

In one form, the teachings of the present disclosure provide for a shower attachment device that includes a funnel, an elastic cord, a cleat, and a hose. The funnel includes a top portion defining an inlet and a bottom portion defining an outlet. The elastic cord is coupled to a first side of the top portion. The cleat extends from a second side of the top portion that is opposite the first side. The cleat is configured to cooperate with the elastic cord to permit the elastic cord to be removably coupled to the second side of the top portion. The hose is attached to the outlet and in fluid communication with an interior of the funnel.

According to a variety of alternate forms: the elastic cord is a length such that when coupled to the second side via the cleat, the elastic cord is configured to secure a shower head between two segments of the elastic cord; the funnel includes a funnel body and the top portion includes a lip ring disposed about a central axis of the funnel, the cleat extending radially outward from the lip ring relative to the central axis, the lip ring being coupled to a rim of the funnel body and defining the inlet of the top portion, wherein the funnel body is formed of flexible material and the lip ring is more rigid than the funnel body; the shower attachment device further includes a connector including a connector inlet portion and a connector outlet portion, the connector inlet portion being coupled directly to the outlet of the bottom portion of the funnel, the connector outlet portion being coupled directly to the hose, the connector being more rigid than the funnel body; the connector inlet portion includes a connector side wall and a top connector lip, wherein a side wall of the bottom portion is disposed about the connector side wall and in sealing contact therewith, wherein the top connector lip extends radially outward from the connector side wall and abuts a lower lip of the bottom portion to inhibit downward axial movement of the connector relative to the side wall of the bottom portion; the lip ring includes an inner ring body and an outer ring body, wherein the rim is secured between the inner ring body and the outer ring body; one of the inner ring body and the outer ring body includes a plurality of locking protrusions and the other one of the inner ring body and the outer ring body includes a plurality of mating recesses configured to accept a corresponding one of the locking protrusions to secure the inner ring body to the outer ring body; the cleat is unitarily formed with the outer ring body; one of the rim and the lip ring defines a plurality of bosses and the other of one of the rim and the lip ring defines a plurality of recesses, each boss disposed within a corresponding recess to secure the funnel body to the ring; the lip ring defines a first aperture and a second aperture, the first and second apertures being located on the second side of the inlet of the top portion, the elastic cord extending through the first and second apertures; the cleat includes a neck and a pair of horns that extend in opposite directions from the neck, the neck extending radially outward from the top portion of the funnel; the funnel includes a platform, the platform being between the inlet of the top portion and the outlet of the bottom portion, wherein the platform includes a plurality of protrusions that protrude from a top surface of the platform in a direction toward the inlet; the protrusions are arranged such that a liquid flowing on the top surface of the platform cannot travel in a straight line from an outer perimeter of the top surface to a drain aperture defined by the top surface that drains to the bottom portion; the bottom portion is movable between a first position and a second position, wherein in the first position, the platform is axially between the top portion and the bottom portion, and wherein when in the second position, the bottom portion is at least partially positioned axially between the top portion and the platform.

In another form, the teachings of the present disclosure provide for a shower attachment device including a funnel, an elastic cord, and a hose. The funnel is disposed about a central axis. The funnel includes a platform and a bottom portion. The funnel is configured to be in a first position in which the platform is between an inlet of the funnel and the bottom portion. The platform includes a plurality of protrusions that protrude from a top surface of the platform and extend in a direction toward the inlet. The elastic cord is coupled to a first side of the funnel and configured to be coupled to a second side of the funnel that is diametrically opposite the first side. The hose is configured to be attached to an outlet of the bottom portion.

According to a variety of alternate forms: the elastic cord is a length such that when coupled to the first and second sides, the elastic cord is configured to secure a shower head between two segments of the elastic cord; the protrusions are arranged such that a liquid flowing on the top surface of the platform cannot travel in a straight line from an outer perimeter of the top surface to an aperture defined by the top surface that drains into the bottom portion; the shower attachment device further includes a cleat extending from the second side of the funnel and configured to secure the elastic cord to the second side of the funnel; the top surface of the platform is substantially perpendicular to the central axis; the bottom portion is movable between a first position and a second position, wherein in the first position, the platform is axially between the inlet of the funnel and the bottom portion, and wherein when in the second position, the bottom portion is at least partially axially between the inlet of the funnel and the platform.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein may include alternative forms or constructions and are not intended to limit the scope of the disclosure. In some examples, well-known processes, well-known device structures, and well-known technologies are not described in detail.

Figure 1:
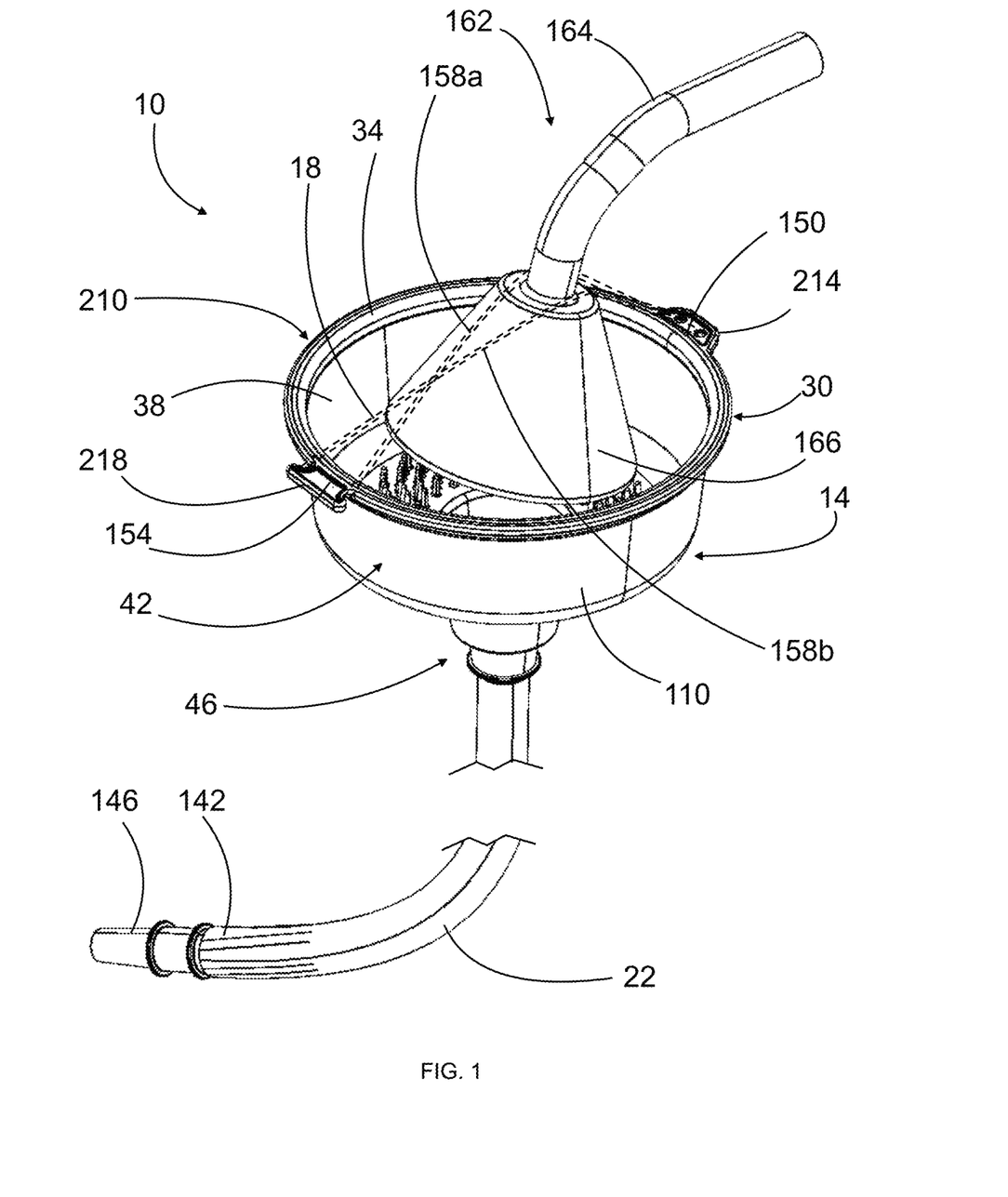
FIG. 1 is a perspective view of a shower adapter device, in accordance with the teachings of the present disclosure.
Figure 2:
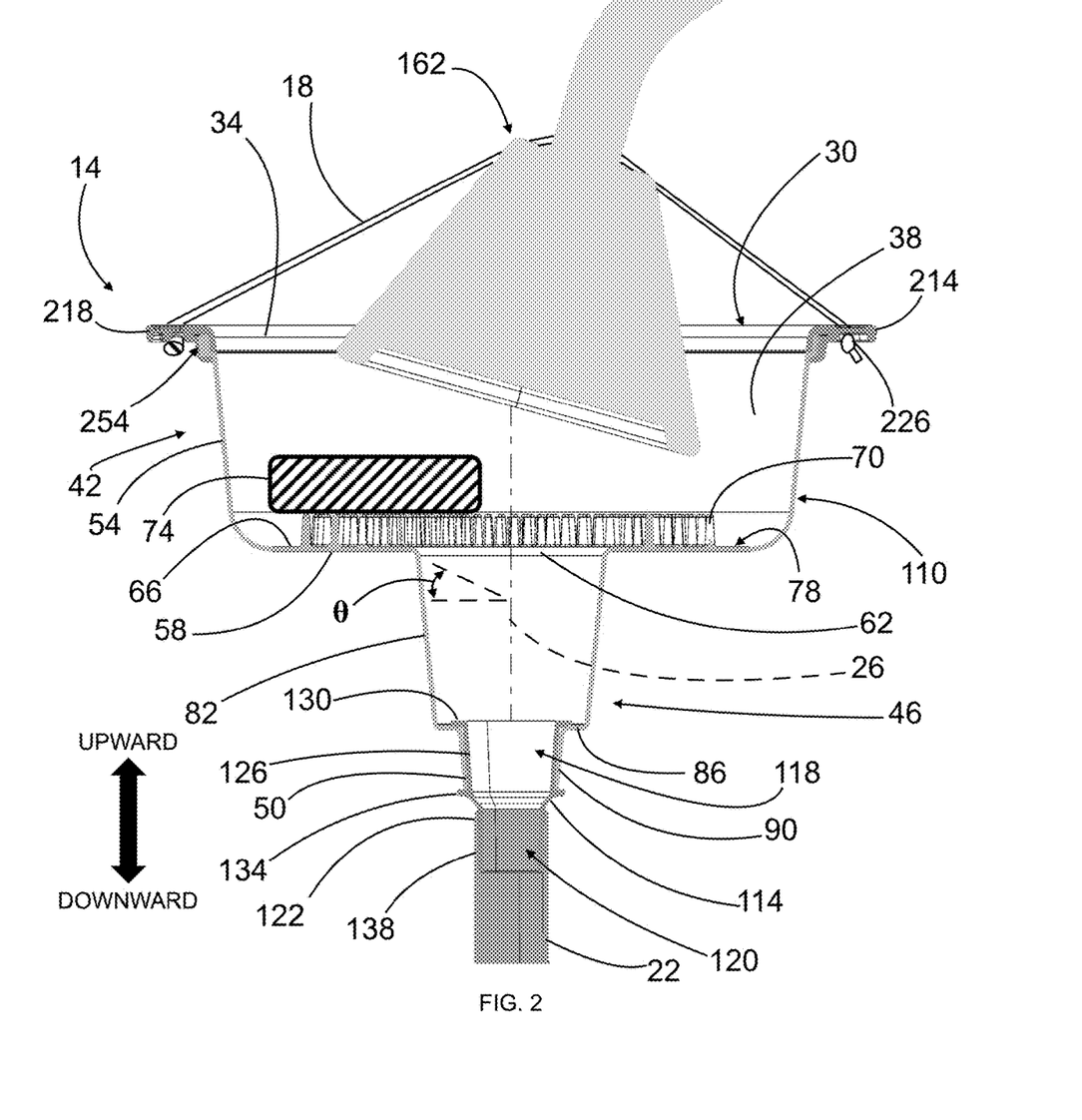
FIG. 2 is cross-sectional view of a portion of the shower adapter device of FIG. 1.

Referring to FIG. 1, a shower adapter device 10 in accordance with the teachings of the present disclosure is illustrated. The shower adapter device 10 includes a funnel 14, an elastic cord 18, and a hose 22. The funnel 14 is disposed about a central axis 26 (FIG. 2). A top portion 30 of the funnel 14 defines an aperture (referred to herein as an inlet 34 of the funnel 14) having a circular shape centered on the axis 26 (FIG. 2). The inlet 34 is open to receive liquid (not shown; e.g., water) into a reservoir 38 defined by an interior of a middle portion 42 of the funnel 14. A bottom portion 46 (also referred to herein as a drain portion) of the funnel 14 defines a bottom aperture 50 (FIG. 2) in fluid communication with the reservoir 38 to receive the liquid therefrom. In the example provided, the bottom aperture 50 (FIG. 2) is a circular shape centered on the axis 26.

Referring to FIG. 2, the middle portion 42 of the funnel 14 includes a first side wall 54 and a platform 58. The first side wall 54 is an annular shape concentrically disposed about the axis 26. The first side wall 54 extends from the top portion 30 to the platform 58. In the example provided, the first side wall 54 tapers radially inward as it approaches the platform 58. In an alternative form, not specifically shown, the first side wall 54 may remain perpendicular to the axis 26 between the top portion 30 and the platform 58. The first side wall 54 may transition smoothly into the platform, such as via a fillet for example.

The platform 58 extends radially inward from the first side wall 54 and defines a drain aperture 62. In the example provided, the drain aperture 62 is a circular shape concentric with the inlet 34. In the example provided, a top surface 66 of the platform 58 can naturally (e.g., when at rest such that the funnel body 110 is not filled with water) have a generally flat grade or slope, i.e., $\theta=0°$, wherein $\theta$ is the angle between the top surface 66 and a plane that is perpendicular to the axis 26. In other words, the top surface 66 is substantially perpendicular to the axis 26 when the funnel body 110 is not filled with water. As such, a person of skill in the art will appreciate that the top surface 66 may be perpendicular to the axis 26 but need not be exactly perpendicular. As described in more detail below, the funnel body 110 can optionally be a flexible material such that the slope, i.e., $\theta$, of the top surface 66 can change (i.e., increase) due to the flexibility and weight of the hose and/or water in the funnel body 110.

In an alternative form, not specifically shown, the top surface 66 may have a downward slope toward the drain aperture 62 even when the funnel body 110 is empty.

Figure 3:
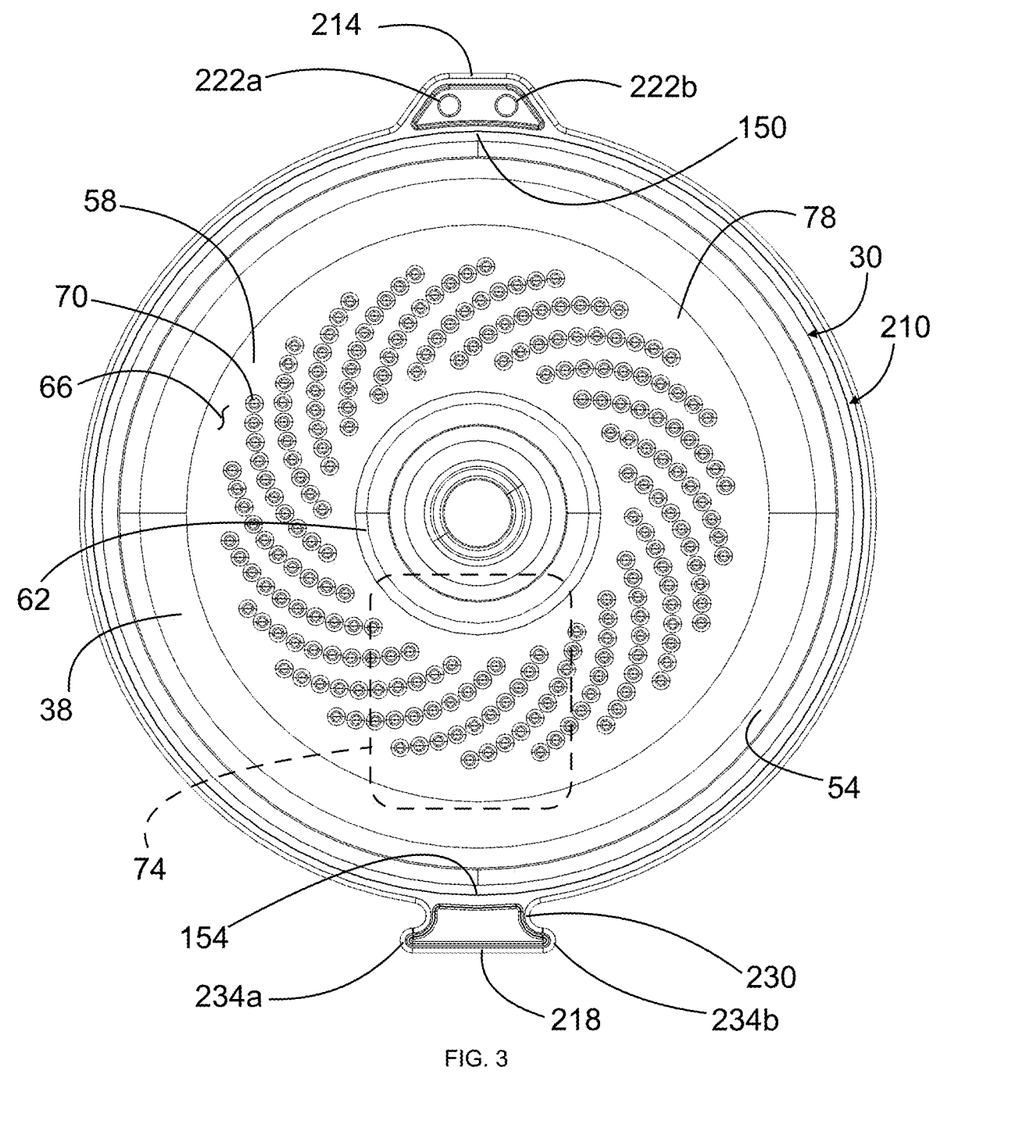
FIG. 3 is a top view of the shower adapter device of FIG. 1.

With continued reference to FIG. 2 and additional reference to FIG. 3, the platform 58 may optionally include a plurality of protrusions 70 that protrude generally upwards from the top surface 66. The protrusions 70 are arranged to slow the flow of liquid toward the drain aperture 62 and to create turbulence and mix the flow of the liquid so that other substances (e.g., soap) can be mixed with the liquid before exiting the reservoir 38 via the drain aperture 62. The protrusions can also be configured to support a solid substance 74 (shown in dashed lines in FIG. 3), such as a bar of soap or foaming or lather substance (e.g., a "bath bomb") for example, above the top surface 66 and to mix the substance with the liquid as the liquid drains toward the drain aperture 62.

For example, the protrusions 70 can be arranged to block direct linear paths along the top surface from the first side wall 54 to the drain aperture 62. In the example provided, the protrusions 70 are arranged in a spiral pattern about the drain aperture 62, though other configurations can be used including randomized arrangements (not shown). The spiral pattern can be arranged such that a liquid flowing on the top surface 66 of the platform 58 cannot travel in a straight line from an outer perimeter of the top surface 66 to the drain aperture 62 defined by the top surface 66 that drains to the bottom portion 46. Thus, the spiral pattern can create a whirlpool effect in the water to assist in mixing the water with the soap. In the example provided, the protrusions 70 extend upward a distance of 9.5 mm, though other configurations can be used including taller or shorter protrusions or a mix of heights. Generally, the protrusions 70 extend upward less than half the depth of the reservoir 38.

The top surface 66 may optionally have a portion 78 that is radially between the radially outermost ones of the protrusions 70 and the first side wall 54 such that a solid substance (not specifically shown; e.g., soap) can be shaped or sized to fit in that portion 78 such that the protrusions inhibit the solid substance 74 from moving radially inward and falling down the drain aperture 62.

Referring to FIG. 2, the bottom portion 46 includes a second side wall 82 that extends from the platform 58 downward to toward the bottom aperture 50 below the platform 58. In the example provided, the second side wall 82 tapers radially inward in the downward direction. In an alternative configuration, not specifically shown, the second side wall 82 can be parallel to the axis 26.

In the example provided, the bottom portion 46 also includes a lower lip 86 and a third side wall 90 disposed about the axis but radially inward of the second side wall 82. The lower lip 86 extends radially inward from the second side wall 82 to the third side wall 90.

In the example provided, the first side wall 54, platform 58, second side wall 82, lower lip 86, and third side wall 90 are all one continuous funnel body 110 that is unitarily formed (e.g., molded) of a flexible material. For example, the funnel body 110 may be flourosilicone (i.e., fluorinated silicone rubber) or EPDM rubber (i.e., ethylene propylene diene monomer rubber), though other materials may be used. In one form, the funnel body 110 can be a transparent or translucent material such that a user can see the level and/or presence of water and/or soap in the funnel body 110 from below and/or from the side of the funnel body 110. In an alternative form, the funnel body 110 can be opaque. As described in greater detail below, the funnel body 110 is formed of a flexible material that is configured to flex in order to be moved between an extended position (shown in FIGS. 1 and 2) and a nested position (shown in FIG. 6).

Figure 7:
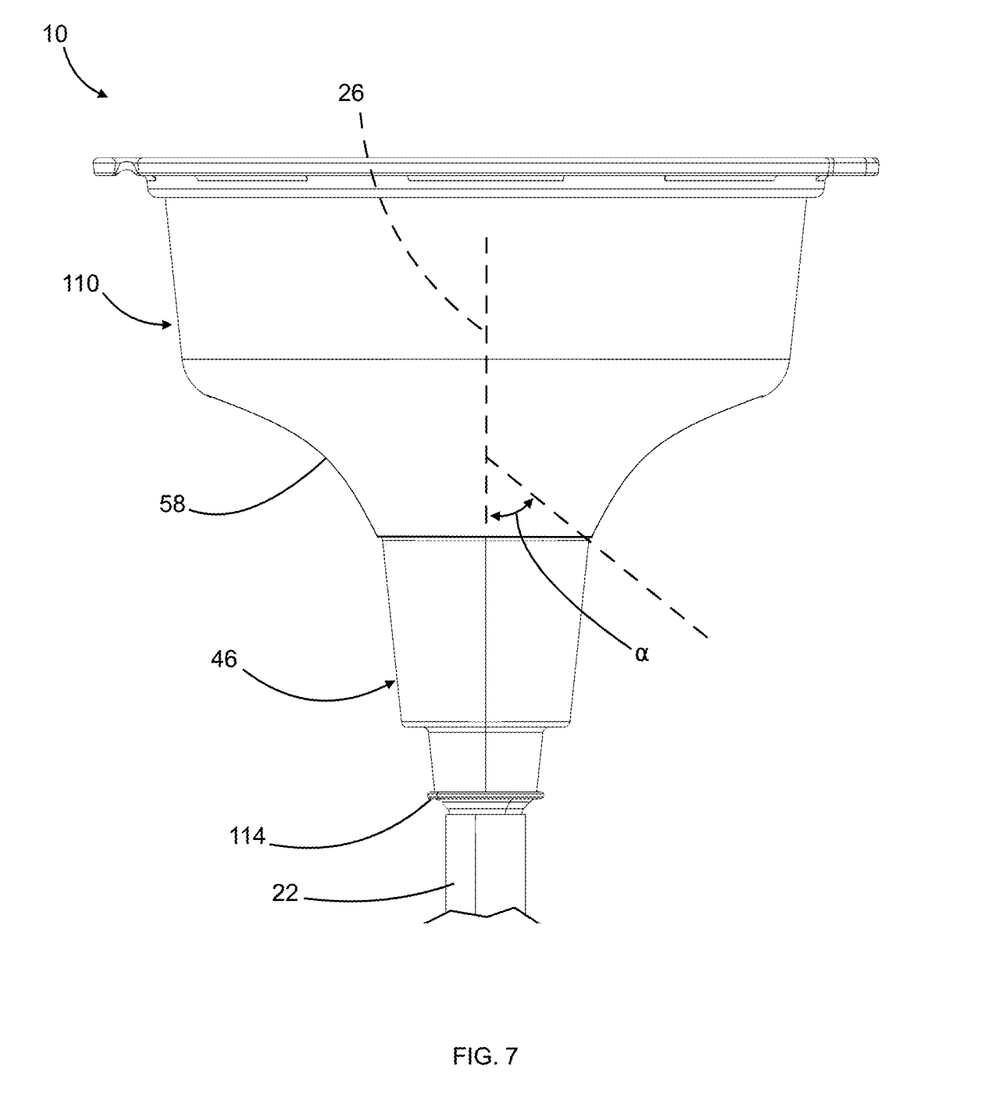
FIG. 7 is a side view of the shower adapter device of FIG. 1, illustrated in a deformed condition in accordance with the teachings of the present disclosure.

In one form, shown in FIG. 7, the material of the funnel body 110 is a thickness and flexibility configured such that the weight of the hose 22 combined with the weight of the water in the funnel body 110 deforms the platform 58 downward so that the slope (e.g., angle θ shown in FIG. 2) is steeper. It should be understood that, in the example shown in FIG. 7, the slope due to the deformation by the weight of the hose 22 and water may not be a constant slope and may depend on the amount of water disposed in the funnel body 110. The increased slope due to the deformation can also reduce the likelihood of water splashing out of the top of the funnel body 110.

In one form, as shown in FIG. 7, the slope can increase with proximity to the bottom portion 46 such that the platform 58 has a generally concave shaped exterior surface. In an another form, not specifically shown, the slope may be a more conical shape. In yet another form, not specifically shown, the slope may be such that the exterior surface of the platform 58 has a generally convex shape. In still another form, not specifically shown, the exterior surface of the platform 58 may have a compound shape that includes an irregular shape or combinations of convex and concave regions.

The material, thickness, and shape of the platform 58 can also be configured to permit the bottom portion 46 to be moved by pulling the hose 22 to angled positions relative to the central axis 26, e.g., such that the bottom portion 46 drains to the hose 22 at an angle α. It should be understood that the angular positions, e.g., angle α, can be in any direction about the axis 26. In one form, the angle α is 45°, though greater or lesser angles can be used.

In the example provided, the shower adapter device also includes a connector 114 (also referred to herein as a nipple) that is an annular rigid component disposed about the axis 26. The connector 114 has a connector inlet portion 118 that attaches to the bottom portion 46 of the funnel body 110 and a connector outlet portion 120 that attaches to a proximal end 122 of the hose 22 to provide and maintain fluid communication between the funnel 14 and the hose 22.

In the example provided, the connector inlet portion 118 includes a connector side wall 126, a top connector lip 130, and a bottom connector lip 134. The connector side wall 126 extends axially between the top connector lip 130 and the bottom connector lip 134 and is recessed radially inward from each. The top connector lip 130 opposes and contacts the lower lip 86 to inhibit the connector 114 from moving downward relative to the third side wall 90. The third side wall 90 is disposed about the connector side wall 126 and is in sealing contact therewith. In the example provided, the third side wall 90 can have a relaxed diameter that is less than the diameter of the connector side wall 126 of the connector 114 such that the elastic nature of the third side wall 90 maintains sealing contact with the connector 114. The bottom connector lip 134 extends radially outward of the connector side wall 126 to inhibit the connector 114 from moving upward relative to the third side wall 90.

In the example provided, the connector outlet portion 120 is disposed within the proximal end 122 of the hose 22 and can have a diameter greater than a relaxed diameter of the proximal end 122 of the hose 22 to form a sealing connection and inhibit removal of the hose 22 therefrom. The connector outlet portion 120 can optionally include one or more ridges 138 (one shown) or barbs configured to increase sealing and/or inhibit unintentional removal of the hose 22.

Referring to FIGS. 1 and 2, the hose 22 is a flexible, hollow tube in which the proximal end 122 is attached to the bottom portion 46 of the funnel 14 for fluid communication with the bottom aperture 50. A distal end 142 of the hose 22 is free to direct the liquid to a desired location below the funnel 14, such as a pet (not shown), for example. The hose 22 can be any suitable length. A rigid nozzle 146 can optionally be attached to the distal end 142 of the hose 22 to improve flow characteristics from the distal end 142 to the desired location. In one form, the rigid nozzle 146 can be a hose-to-hose connector such that an additional length of hose (not shown) may optionally be attached to the hose 22 to effectively lengthen its reach.

Referring to FIGS. 1-3, the top portion 30 of the funnel 14 is a rigid material to maintain the shape of the inlet 34. The elastic cord 18 (shown in dashed lines in FIG. 1 and solid lines in FIG. 2) can be any suitable elastic material, elastic fabric, or elastic composite. In one form, the elastic cord 18 is a cord of a construction that is commonly referred to as a bungee cord, though other configurations can be used such as a rubber cord or other elastomeric construction for example. The elastic cord 18 is coupled to one side 150 (labeled in FIGS. 1 and 3) of the top portion 30 and is a length configured to extend across to span the inlet 34, be secured to the diametrically opposite side 154 (labeled in FIGS. 1 and 3) of the top portion 30, and return back to the side 150.

Figure 8:
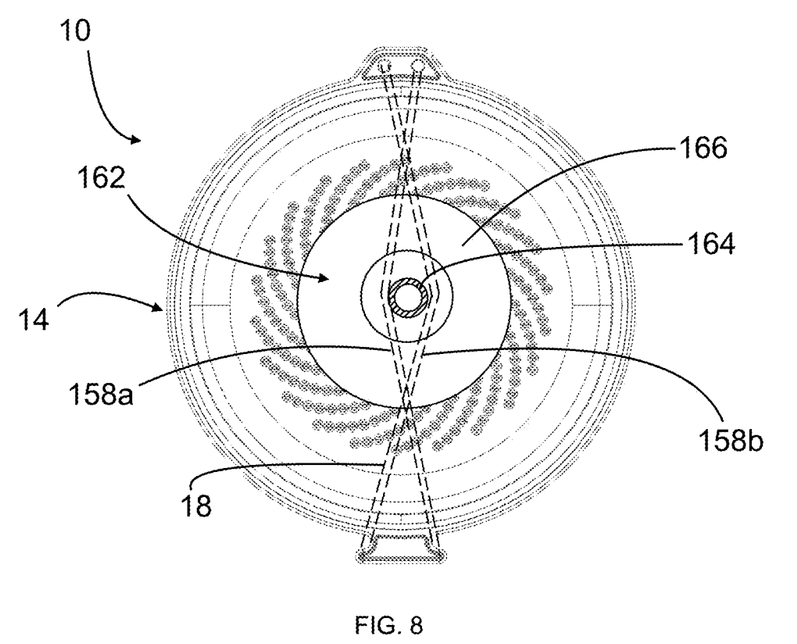
FIG. 8 is a top view of the shower adapter device of FIG. 1, illustrating an elastic cord of the shower adapter device in a twisted condition to retain the shower adapter device on a shower in accordance with the teachings of the present disclosure.

Thus, when the elastic cord 18 is secured to both sides 150, 154, it has a pair of lengths 158a and 158b (FIG. 1) that each span the inlet 34 and receive a shower head 162 between them. With additional reference to FIG. 8, the elastic cord 18 is twisted twice such that the lengths 158a and 158b cross each other on opposite sides of the shower head 162. This twisting of the elastic cord 18 maintains the shower head 162 between the two lengths 158a and 158b and attaches the shower adapter device 10 to the shower head 162. Since a typical shower head 162 is wider at the outlet of its nozzle 166 than at its connecting pipe 164, the elastic cord is configured such that the twists of the two lengths 158a and 158b pinch the nozzle 166 or the connecting pipe 164 to secure the funnel 14 onto the shower head 162 such that the shower head 162 is positioned above the funnel 14 to spray water (not shown) into the reservoir 38. In the example provided, the shower head 162 is received within the reservoir 38, though other configurations can be used such as being positioned above the reservoir 38.

Figure 9:
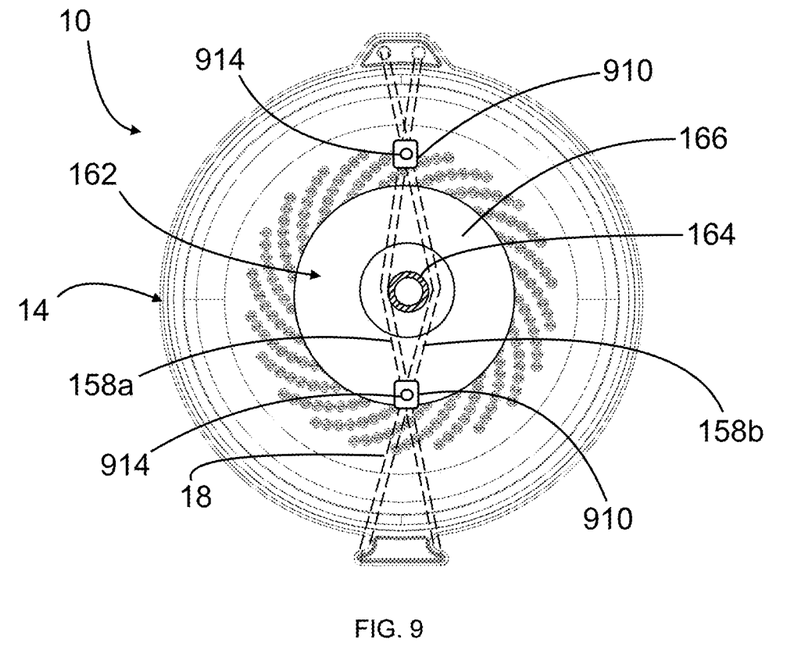
FIG. 9 is top view of a shower adapter device of FIG. 1, illustrating the elastic cord with optional sliders for retaining the shower adapter device on a shower in accordance with the teachings of the present disclosure.

In an alternative configuration, shown in FIG. 9, the elastic cord 18 can optionally be equipped with cord locks 910. In the example shown in FIG. 9, a corresponding cord lock 910 is on each side of the shower head 162 and the cord locks 910 bring the two lengths 158a and 158b together to cinch the elastic cord 18 around the shower head 162. In an alternative configuration, not specifically shown, a single cord lock 910 can be used and the other side can be twisted, similar to FIG. 8. The cord locks 910 can be any suitable type of cord lock configured to pull the two lengths 158a and 158b together. The cord locks 910 be configured to be slid along he lengths 158a and 158b while being selectively locked in a position along those lengths 158a and 158b. For example, the cord locks 910 may have friction elements that inhibit sliding unless the force exceeds a predetermined threshold or the cord locks 910 may have grip features that a user can selectively engage. In the form shown, the cord locks 910 include optional spring biased buttons 914 that inhibit sliding when released and permit sliding when pressed.

Returning to FIGS. 1-3, the funnel 14 does not form a seal with the shower head 162. In other words, the reservoir remains open to the surroundings even when attached to the shower head 162. Thus, the pressure of the liquid flow from the hose 22 is substantially based on the head pressure within the reservoir 38 and not the water pressure within the connecting pipe 164.

In the example provided, the top portion 30 includes a ring 210, an attachment flange 214 and a cleat 218. The attachment flange 214 protrudes radially outward from the ring 210 at the side 150 and the cleat 218 extends radially outward from the ring 210 at the other side 154. The attachment flange 214 includes a pair of cord apertures 222a and 222b (labeled in FIG. 3).

One end of the elastic cord 18 is received through the cord aperture 222a and secured therein and the other end of the elastic cord 18 is received through the cord aperture 222b and secured therein. Referring to FIG. 2, a knot 226 that is larger than the cord aperture 222a may be tied below the cord aperture 222a to secure the end of the elastic cord 18 to the attachment flange 214. Similarly, but not specifically shown, a knot can be used to secure the other end of the elastic cord 18 relative to the cord aperture 222b.

Referring to FIG. 3, the cleat 218 includes a cleat base 230 and a pair of horns 234a and 234b. A proximal end of the cleat base 230 is coupled to the ring 210. The cleat base 230 extends radially outward from the ring 210 to a distal end of the cleat base 230. The horns 234a, 234b extend from the distal end of the cleat base 230 in opposite directions of each other. Thus, the cleat 218 is configured such that a midsection of the elastic cord 18 (FIG. 1) can be removably hooked or looped around the cleat base 230 and retained thereon by the horns 234a, 234b.

In an alternative configuration, not specifically shown, the top portion 30 can include more than one cleat 218. In one such form, the top portion 30 includes two or more cleats 218, spaced circumferentially about the top portion 30 and the elastic cord 18 (FIG. 1) can be looped around each cleat 218 to provide stability in multiple directions when attached to the shower head 162. In another such form, the top portion 30 can include two or more cleats 218 and two or more attachment flanges 214 disposed diametrically opposite each cleat 218. An elastic cord 18 can be attached to each attachment flange 214 and configured to span the top portion 30 to its corresponding cleat 218 to provide stability in multiple directions when attached to the shower head 162. In one such form, the cleats 218 are spaced apart from each other in the circumferential direction by 90 degrees and the attachment flanges 214 are likewise spaced apart by 90 degrees, though other configurations can be used.

Figure 4:
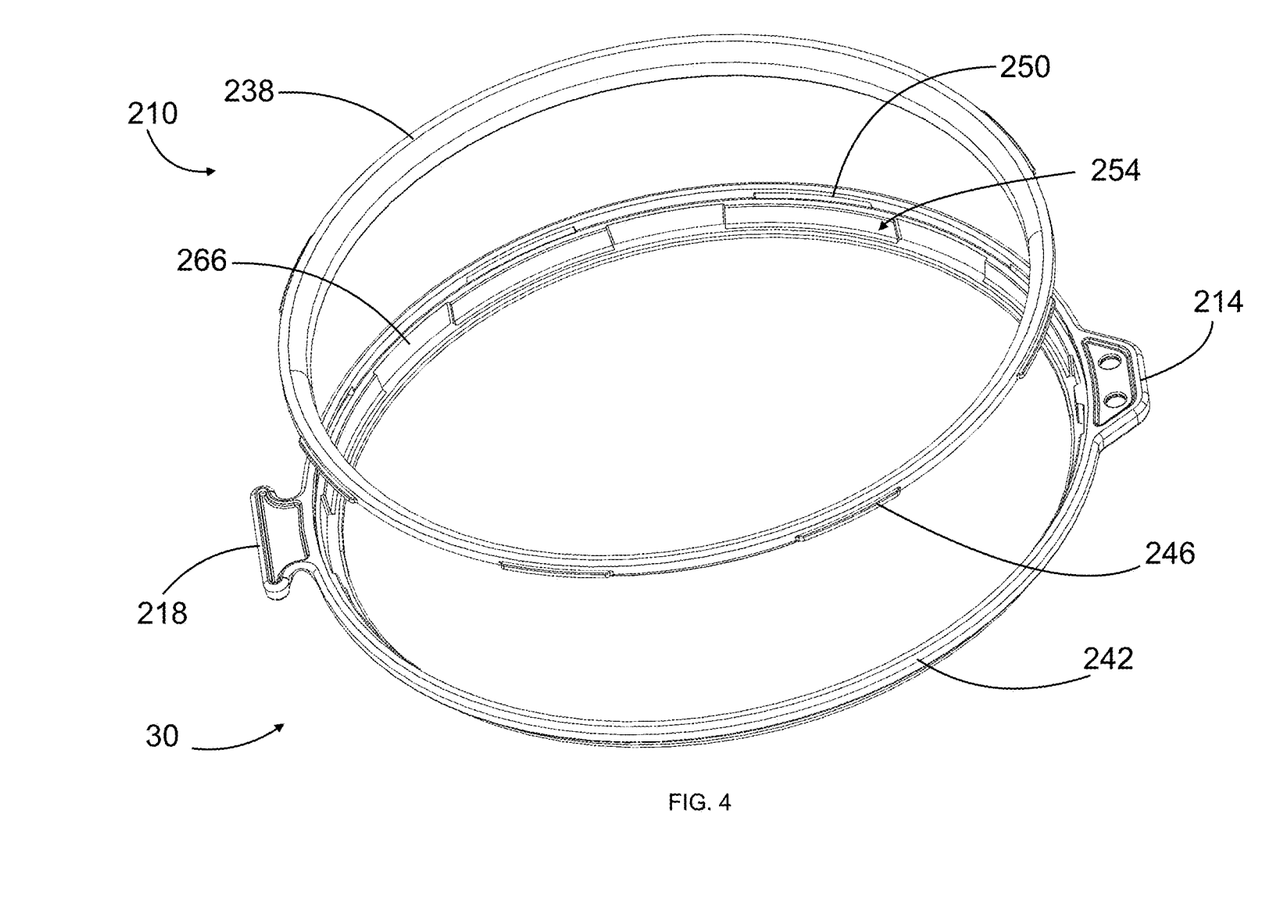
FIG. 4 is an exploded perspective view of a portion of the shower adapter device of FIG. 1, illustrating an upper ring and a lower ring of the shower adapter device.
Figure 5:
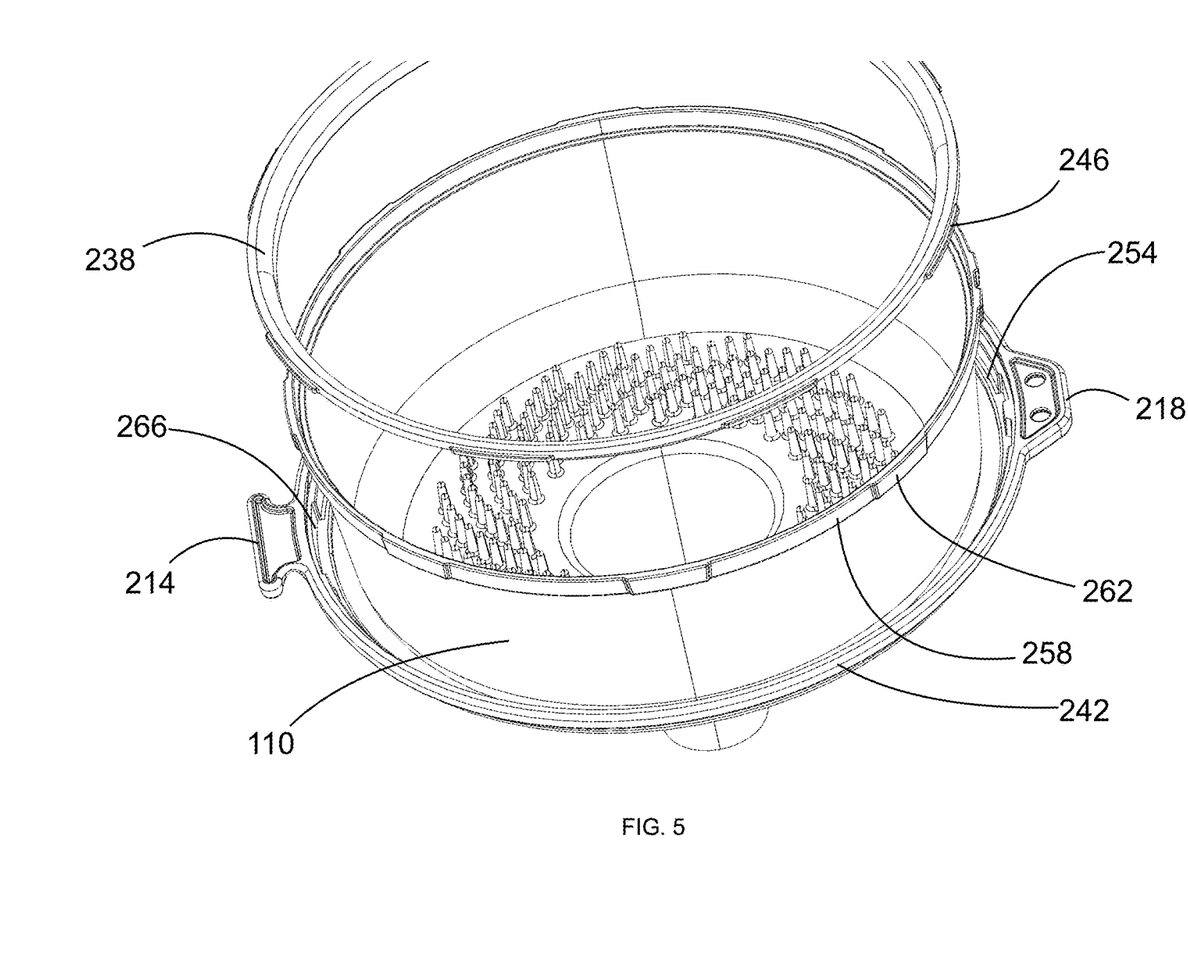
FIG. 5 is another exploded perspective view of a portion of the shower adapter device of FIG. 1, illustrating the upper ring and lower ring with a funnel body of the shower adapter device.

Referring to FIGS. 4 and 5, the ring 210 may optionally be an assembly that includes an inner ring 238 and an outer ring 242 that can snap together in a manner that secures the funnel body 110 (FIG. 5) to the top portion 30. In the example provided, the inner ring 238 defines a plurality of snap protrusions 246 disposed about an outer perimeter of the inner ring 238 and the outer ring 242 defines a plurality of mating locking recesses 250 or apertures configured to receive the snap protrusions 246 therein to secure the inner ring 238 to the outer ring 242, though other configurations can be used.

When the inner ring 238 and the outer ring 242 are snapped together, they cooperate to define a cavity 254 in which a top lip 258 of the funnel body 110 is received and retained. In the example provided, the top lip 258 defines a plurality of bosses 262 or protrusions that mate with recesses 266 in the outer ring 242 to inhibit rotation of the funnel body 110 relative to the ring 210.

In the example provided, the cleat 218 and attachment flange 214 are integrally formed with the outer ring 242. In an alternative construction, not specifically shown, the cleat 218 and attachment flange 214 are integrally formed with the inner ring 238.

In an alternative construction, not specifically shown, the ring 210 may be connected to the funnel body 110 in a different manner, such as being overmolded by the funnel body 110 for example.

Figure 6:
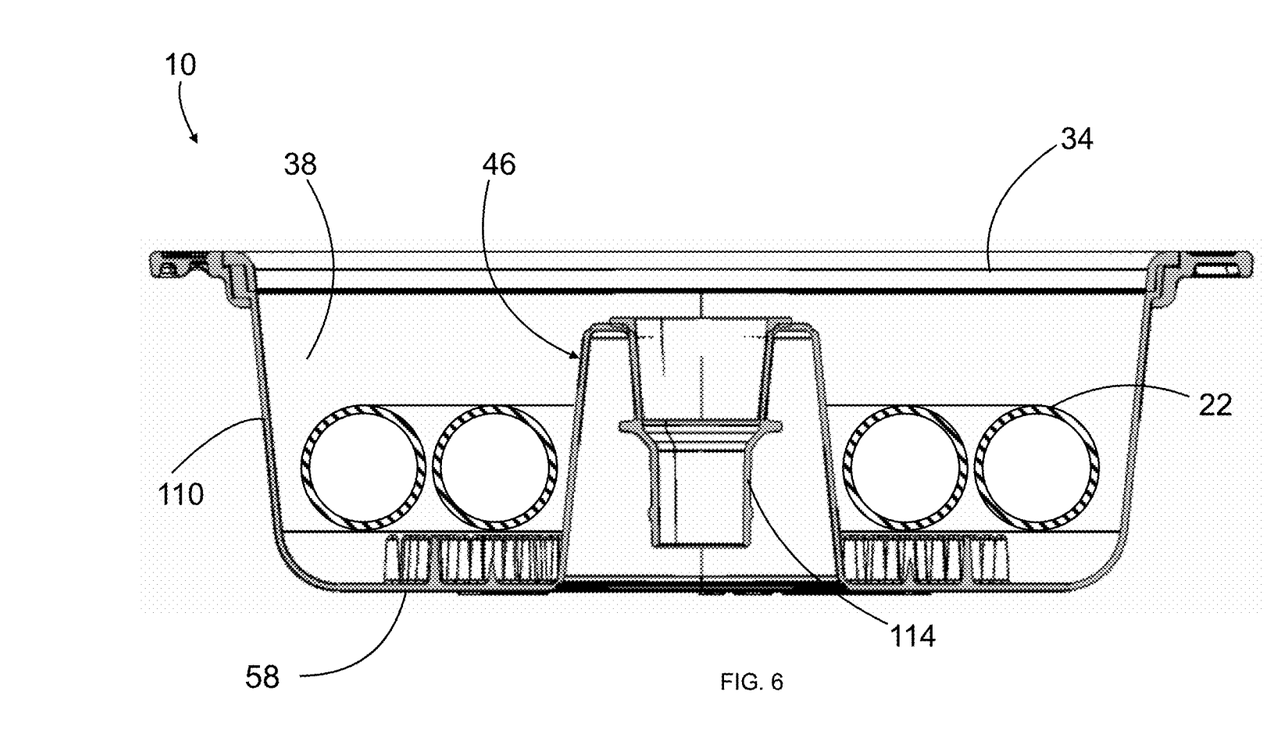
FIG. 6 is a cross-sectional view of the shower adapter device of FIG. 1, illustrated in a folded position.

Referring to FIG. 6, the funnel body 110 is illustrated in a folded position. In the folded position, the bottom portion 46 of the funnel body 110 is folded up and into the reservoir 38. As illustrated in FIG. 6, the hose 22 may be removed and coiled up around the bottom portion 46 within the reservoir 38 for storage.

Alternatively, the hose 22 may remain attached to the connector 114 with the shower adapter device 10 in the folded position. The reservoir 38 may then be filled with liquid. The liquid is retained in the reservoir 38 due to the bottom portion 46 being inverted so that the connector 114 is elevated above the platform 58. The hose 22 may then be pulled downward to move the bottom portion 46 back to the extended position (FIGS. 1 and 2) so that a large volume of liquid can quickly flow through the hose 22 with the additional head pressure of the full reservoir 38.

While described herein for use with showers and soaps, the shower adapter device 10 may be used in other applications to catch, mix, and redirect other substances.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A shower attachment device comprising:
a funnel disposed about a central axis, the funnel including a platform and a bottom portion, the funnel being configured to be in a first position in which the platform is between an inlet of the funnel and the bottom portion, the platform including a plurality of protrusions that protrude from a top surface of the platform and extend in a direction toward the inlet;
an elastic cord coupled to a first side of the funnel and configured to be coupled to a second side of the funnel that is diametrically opposite the first side; and
a hose configured to be attached to an outlet of the bottom portion.

2. The shower attachment device according to claim 1, wherein the elastic cord is a length such that when coupled to the first and second sides, the elastic cord is configured to secure a shower head between two segments of the elastic cord.

3. The shower attachment device according to claim 1, wherein the protrusions are arranged such that a liquid flowing on the top surface of the platform cannot travel in a straight line from an outer perimeter of the top surface to an aperture defined by the top surface that drains into the bottom portion.

4. The shower attachment device according to claim 1 further comprising a cleat extending from the second side of the funnel and configured to secure the elastic cord to the second side of the funnel.

5. The shower attachment device according to claim 1, wherein the top surface of the platform is substantially perpendicular to the central axis.

6. The shower attachment device according to claim 1, wherein the bottom portion is movable between the first position and a second position, wherein in the first position, the platform is axially between the inlet of the funnel and the bottom portion, and wherein when in the second position, the bottom portion is at least partially axially between the inlet of the funnel and the platform.

7. The shower attachment device according to claim 1, wherein the platform defines a drain aperture, and wherein the drain aperture is concentric with the inlet.

8. The shower attachment device according to claim 1, wherein the plurality of protrusions are arranged in a spiral pattern on the platform.

9. The shower attachment device according to claim 1, wherein the top surface of the platform includes a portion that is radially between a radially outermost protrusion of the plurality of protrusions and a first side wall of the funnel.

10. The shower attachment device according to claim 9, wherein the bottom portion includes a second side wall that extends from the platform downward toward a bottom aperture below the platform.

11. The shower attachment device according to claim 1, wherein the funnel further includes a first annular side wall and a second annular side wall, and wherein the first annular side wall has a diameter that is greater than a diameter of the second annular side wall.

12. The shower attachment device according to claim 11, wherein the first annular side wall, the second annular side wall and the platform form a continuous, unitary funnel.

13. The shower attachment device according to claim 11, wherein the second annular side wall is located between the platform and the outlet of the bottom portion.

14. The shower attachment device according to claim 1, wherein the platform defines a drain aperture, and wherein the plurality of protrusions are radially between a side wall and the drain aperture.

* * * * *